Oct. 1, 1957  S. ADLER ET AL  2,808,547
SYNCHRO GENERATING MEANS
Filed Aug. 19, 1955  2 Sheets-Sheet 1
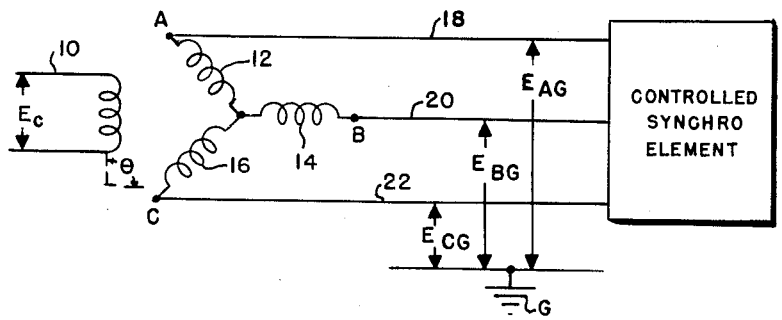
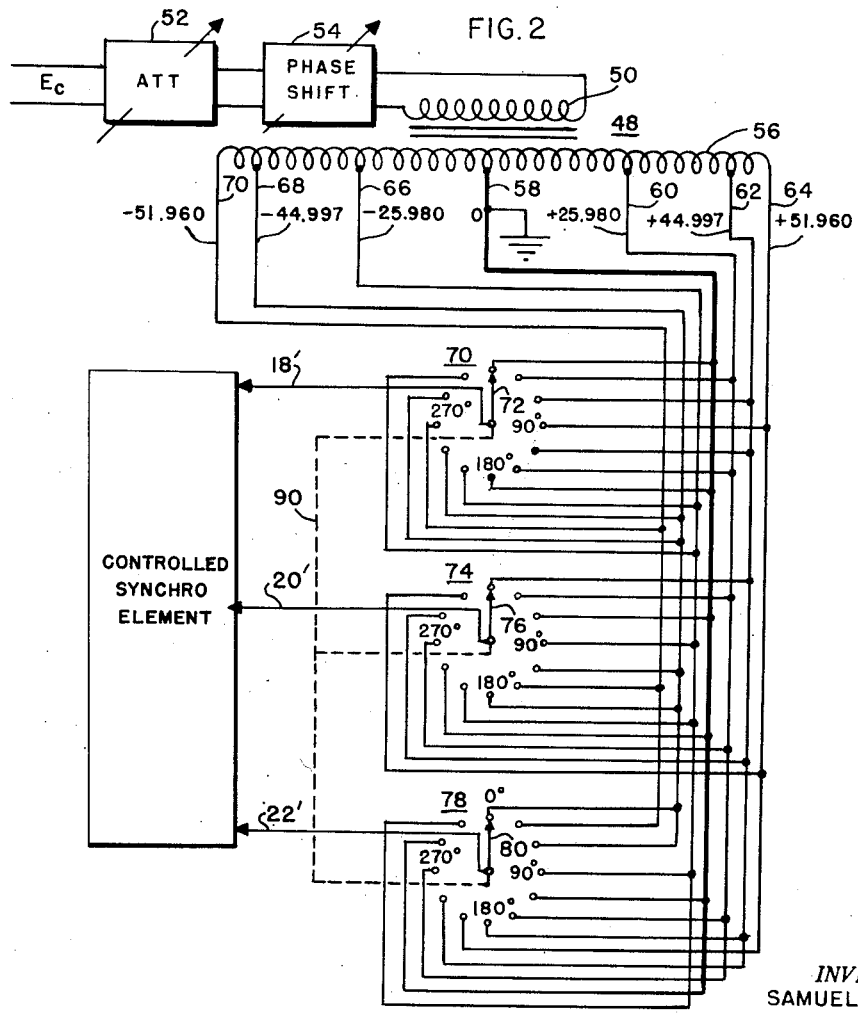
INVENTORS,
SAMUEL ADLER
JOSEPH DAMON
MARTIN MAURER
BY Frederick M. Strader
ATTORNEY.

Oct. 1, 1957 S. ADLER ET AL 2,808,547
SYNCHRO GENERATING MEANS
Filed Aug. 19, 1955 2 Sheets-Sheet 2

INVENTORS,
SAMUEL ADLER
JOSEPH DAMON
MARTIN MAURER
BY
ATTORNEY.

United States Patent Office 2,808,547
Patented Oct. 1, 1957

2,808,547

SYNCHRO GENERATING MEANS

Samuel Adler, Wanamassa, N. J., Joseph Damon, Brooklyn, N. Y., and Martin Maurer, Nixon, N. J., assignors to the United States of America as represented by the Secretary of the Army Application August 19, 1955, Serial No. 529,597

16 Claims. (Cl. 318—24)

(Granted under Title 35, U. S. Code (1952), sec. 266)

The invention described herein may be manufactured and used by or for the Government for governmental purposes, without the payment of any royalty thereon.

This invention relates to self-synchronous repeater systems known as synchros, and more particularly to a means for eliminating or simulating the synchro generator which is normally a part of such systems.

Such systems are commonly used for transmitting motion from one point to one or more remote points by means of an electrical linkage. The motion to be transmitted is applied to the movable armature of a synchro generator which generates for each position several voltages which together are uniquely representative of said position. These voltages are transmitted through electrical channels to a synchro motor or receiver which rotates its armature to a position which is representative of the position of the generator armature.

Accurate synchro generators are extremely difficult, and hence expensive, to make. It is a primary object of this invention to provide a simple and inexpensive means for simulating the operation of a synchro generator with a high degree of accuracy. Because of its simplicity it can be cheaply produced in large quantities and made available at all remote locations for testing the accuracy of the synchro receivers at said locations, thus obviating the necessity of maintaining a highly expensive synchro generator at said locations merely for testing purposes.

For a better understanding of the invention together with other and further objects thereof, reference is had to the following description taken in connection with the accompanying drawing, in which:

Fig. 1 is a schematic circuit diagram of a conventional synchro system;

Fig. 2 is a circuit diagram of one embodiment of the invention; and

Figure 3:
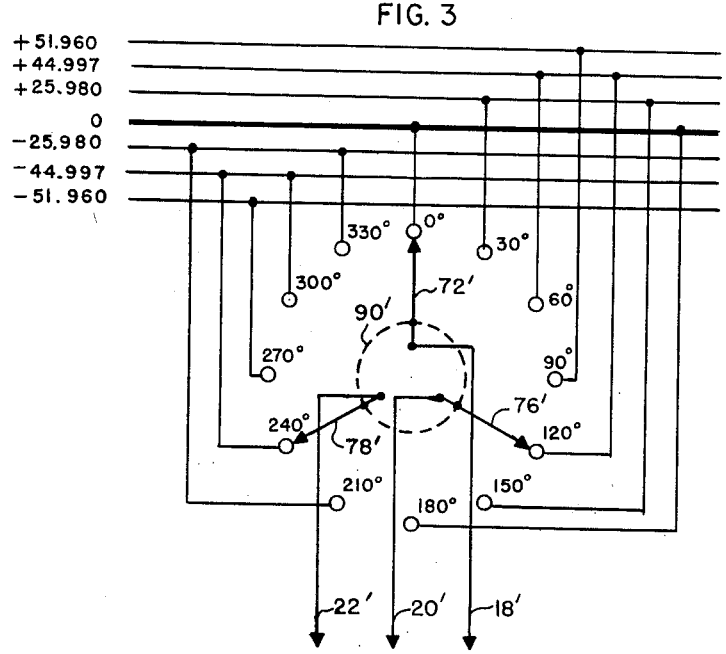
Figs. 3 and 4 are schematic circuit diagrams of modifications of the circuit in Fig. 2.

Before describing the invention herein, it is desirable to review the operation of a conventional synchro system such as illustrated in Fig. 1. The synchro generator comprises rotatable armature 10, excited by an alternating input voltage $E_c$ which is termed the carrier voltage. The stationary field comprises three coils 12, 14 and 16 having their magnetic axes equally spaced about the axis of the armature. The coils are Y-connected to a common connection. The root-mean square (R. M. S.) voltage across each stator coil is a sinusoidal function of the angle $\theta$ between the magnetic axes of the rotor coil and said stator coil.

The voltages across lines 18, 20, and 22 connected to the stator terminals are transmitted to the controlled synchro component which can be any conventional type, such as a synchro motor, synchro differential, synchro generator, synchro control transformer, etc., or combinations thereof.

The following table shows the magnitudes and phase polarities of the R. M. S. voltages $E_{AG}$, $E_{BG}$, and $E_{CG}$ between points A, B, and C, respectively, and the neutral ground connection G, in a standard 60 cycle 115/90 volt synchro generator for angles of $\theta$ increasing in 10° increments.

| $\theta$ | $E_{AG}$ | $E_{BG}$ | $E_{CG}$ |
|---|---|---|---|
| 0 | 0 | +44.997 | −44.997 |
| 10 | +9.041 | +39.801 | −48.842 |
| 20 | +17.770 | +33.410 | −51.181 |
| 30 | +25.980 | +25.980 | −51.960 |
| 40 | +33.410 | +17.770 | −51.181 |
| 50 | +39.801 | +9.041 | −48.842 |
| 60 | +44.997 | 0 | −44.997 |
| 70 | +48.842 | −9.041 | −39.801 |
| 80 | +51.181 | −17.770 | −33.410 |
| 90 | +51.960 | −25.980 | −25.980 |
| 100 | +51.181 | −33.410 | −17.770 |
| 110 | +48.842 | −39.801 | −9.041 |
| 120 | +44.997 | −44.997 | 0 |
| 130 | +39.801 | −48.842 | +9.041 |
| 140 | +33.410 | −51.181 | +17.770 |
| 150 | +25.980 | −51.960 | +25.980 |
| 160 | +17.770 | −51.181 | +33.410 |
| 170 | +9.041 | −48.842 | +39.801 |
| 180 | 0 | −44.997 | +44.997 |
| 190 | −9.041 | −39.801 | +48.842 |
| 200 | −17.770 | −33.410 | +51.181 |
| 210 | −25.980 | −25.980 | +51.960 |
| 220 | −33.410 | −17.770 | +51.181 |
| 230 | −39.801 | −9.041 | +48.842 |
| 240 | −44.997 | 0 | +44.997 |
| 250 | −48.842 | +9.041 | +39.801 |
| 260 | −51.181 | +17.770 | +33.410 |
| 270 | −51.960 | +25.980 | +25.980 |
| 280 | −51.181 | +33.410 | +17.770 |
| 290 | −48.842 | +39.801 | +9.041 |
| 300 | −44.997 | +44.997 | 0 |
| 310 | −39.801 | +48.842 | −9.041 |
| 320 | −33.410 | +51.181 | −17.770 |
| 330 | −25.980 | +51.960 | −25.980 |
| 340 | −17.770 | +51.181 | −33.410 |
| 350 | −9.041 | +48.842 | −39.801 |

The above table shows that for the 36 steps there are developed only nine positive voltages and nine negative voltages, in addition to zero voltage, making a total of nineteen voltage values. It also shows that the same series of R. M. S. voltages appear across each of the three coils as the generator armature is turned, but with a positional phase displacement $\theta$ of 120° between the R. M. S. voltage across the coil relative to the R. M. S. voltages across the two other coils, that is, the envelope of the R. M. S. voltages developed across each coil is a sinusoidal function of $\theta$ with the envelope of one coil being phase displaced 120° relative to the envelopes of the other coils.

In accordance with the present invention, voltages such as developed by the synchro generator G at successive discrete positional increments are derived from a simple tapped impedance, preferably a transformer, the secondary of which is tapped to provide the various voltages listed in the above table. By means of three rotary switch elements, the three voltages representative of the desired angle $\theta$ are selected in discrete steps, which may be made as small as desired.

An illustration of such an apparatus is shown in Fig. 2. To facilitate the showing of the connections, the drawing shows a means for generating and selecting the voltages for discrete changes of angle $\theta$ in steps of 30° beginning with $\theta$ equals zero. Transformer 48 comprises a primary winding 50 connected to the A. C. carrier input voltage $E_c$ through a variable attenuator 52, which adjusts the amplitude of the input voltage, and a variable phase shifter 54, which adjusts the reference phase of the input voltage. Secondary coil 56 of the transformer is provided with a center tap 58, which is grounded to provide the neutral or zero reference voltage. Three taps 60, 62, and 64 are provided on one side of center tap 58 to provide a first set of three voltages which are of one polarity relative to the center tap, and three taps 66, 68 and 70 are provided on the opposite side of the center tap to provide a second set of similar voltages of the opposite polarity with respect to the center tap. The six voltages generated, in addition to zero voltage provided by the center tap, are ± 25.980 volt, ±44.997 and ±51.960 volts. Reference to the above table will show that combinations of these voltages will provide for twelve positional angles $\theta$, from zero to 360°, in thirty degree steps.

On form of circuit for selecting the proper voltage combinations for the twelve positions, comprises three switches 70, 74, and 78, respectively having movable arms 72, 76 and 80, all mechanically coupled together for unicontrol, as shown by the broken line 90. Each switch has ten stationary contacts which are selectively contacted by the movable arms. The stationary contacts are connected to the proper transformer taps for the various positions, as shown. Movable contacts 72, 76 and 78 are respectively connected to lines 18', 20', and 22', which correspond to lines 18, 20, and 22 of Fig. 1. Thus, with the movable arms 70, 76, and 78 in the $\theta$ equals zero position, as shown, the stationary contact on switch 72 connects line 18' to the zero voltage tap on the transformer, the stationary contact on switch 74 connects line 20' to the +44.997 voltage tap on the transformer, and the stationary contact on switch 78 connects line 22' to the —44.997 tap on the transformer. A tracing of the connections will show that the proper voltages, as shown in the above table, are selected by the switches in all the twelve positions for deriving the voltage combinations for all the twelve angular positions in equal steps of thirty degrees.

Lines 18', 20', and 22', respectively, supply the voltages $E_{AG}$, $E_{BG}$ and $E_{CG}$, to the controlled synchro element. By supplying additional taps on the transformer and additional stationary contacts on the selector switches, the increment $\Delta$ of the positional angle $\theta$ can be made as small as desired. From an inspection of the above table, it will be seen that the total number of distinct voltages that must be supplied, and hence the total number N of transformer taps is given by the equation:

$$N = \frac{180}{\Delta} + 1$$

Thus, where $\Delta$=30 degrees, as in Fig. 2, N equals 180/30+1=7. If $\Delta$ is 10°, as in the above table, N equals 180/10=1=19. The number of stationary contacts on each selector switch is equal to 360/$\Delta$. It is obvious that $\Delta$ can be made as small as practical considerations permit.

The system in Fig. 2 can be described as a synchro generator simulator. Where only discrete changes in position are to be transmitted, it can be made more accurate than the conventional synchro generator, since the position of the taps can easily be adjusted, and it can be substituted for such generator in any synchro system. Because of its cheapness, it can be supplied to all remote locations for testing purposes, where controlled synchro elements are in operation.

A simplification of the system in Fig. 2, is illustrated in Fig. 3, wherein a single set of stationary contacts are used and three movable contacts 72', 76', and 80' are all movable relative to the stationary contacts. The movable contacts are positioned 120° apart and tied together for motion on the same shaft as indicated by the broken line 90'. The three movable contacts are insulated from each other and respectively connected to output leads 18', 20' and 22'. A tracing of the connections from the switch contacts to the various voltage busses will show that this construction will supply the same combinations of voltages to the controlled synchro element as the switching system in Fig. 2.

Figure 4:
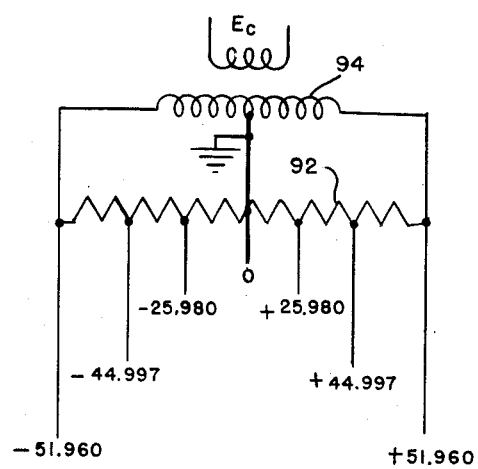

A further modification is shown in Fig. 4, where, instead of using a tapped transformer type of impedance, the various voltages are derived from a tapped potentiometer 92 shunted across the secondary of transformer 94, the center taps of both potentiometers and transformer being grounded. To avoid phase shifts and voltage drops due to the impedance, the potentiometer should be made of low impedance. To permit more uniform spacing of the taps, the potentiometer can be of the sinusoidal type.

Various changes and modifications can be made without departing from the invention, and it is aimed in the appended claims to cover all such modifications.

What is claimed is:

1. In combination, a voltage dividing element adapted to be connected across a source of alternating voltage of predetermined frequency, said element having taps along the length thereof to provide a plurality of voltages of said frequency thereacross, said taps being so spaced that the envelope of said voltages is a sinusoidal function.

2. The combination set forth in claim 1, wherein one of said taps is at the electrical center of said element and equal numbers of the remaining taps are symmetrically located on opposite sides of the center tap.

3. The combination as set forth in claim 2, wherein said element is a transformer.

4. The combination as set forth in claim 2, wherein said element is the secondary of a transformer, the primary of which is adapted to be connected to said source of voltage.

5. The combination as set forth in claim 2, wherein said element is resistive.

6. The combination as set forth in claim 5, wherein the resistance per unit length of said resistive element is proportional to said sinusoidal function.

7. In combination, a voltage divider element adapted to be connected across a source of alternating voltage, said element having taps along the length thereof to provide a plurality of voltages thereacross, said taps being so spaced that the envelope of said voltages is a sinusoidal function, one of said taps being at the electrical center of said element and equal numbers of the remaining taps being symmetrically located on opposite sides of the center tap, and three switch means ganged together for unicontrol and connected to said taps for selecting a plurality of different combinations of voltages, the sum of the voltages of each of said combinations being equal to zero.

8. The combination as set forth in claim 7, wherein the number of said taps in addition to the center tap is equal to half the number of said combinations.

9. The combination as set forth in claim 8, wherein the combination of the voltages afforded by the combination of taps selected by said switch means are proportional to the voltages generated by the stator coils of a three-coil synchro at different angles assumed by the rotor thereof.

10. In combination with a controlled synchro element adapted to receive different combinations of a plurality of voltages, each of said combinations being representative of a different angle to which the movable element of a synchro generator is adjusted; means for generating said combinations of voltages comprising a voltage divider element adapted to be connected across a source of alternating current, said element having taps along the length thereof to provide a plurality of voltages thereacross, said taps being so spaced that the envelope of said voltages is a sinusoidal function of said angle, and means to connect various combinations of said taps to said controlled synchro element.

11. The combination set forth in claim 10, wherein one of said taps is at the electrical center of said element and equal numbers of the remaining taps are symmetrically located on opposite sides of the center tap.

12. The combination as set forth in claim 10, wherein said element is a transformer.

13. The combination as set forth in claim 10, wherein said element is the secondary of a transformer, the primary of which is adapted to be connected to said source of voltage.

14. In combination with a controlled synchro element adapted to receive different combinations of three voltages, the sum of the voltages of each combination being equal to zero, each combination being representative of a different angle to which the rotor of a three-coil synchro generator is adjusted; means for generating said combinations of voltages comprising a transformer the secondary of which is provided with a center tap and an equal plurality of additional taps symmetrically arranged on either side of said center tap, the voltages between said center tap and the other taps being a sinusoidal function of said angle, and three multi-position switch means for inter-connecting different combinations of said taps to said controlled synchro element to provide said different combinations of three voltages, the increment between the different angles represented by said combinations of voltages being constant.

15. The combination as set forth in claim 14, wherein the number of said taps in addition to the center tap is equal to 180 divided by said increment.

16. The combination as set forth in claim 15, wherein the envelopes of the voltages at the taps selected by said switch means are 120° phase displaced.

References Cited in the file of this patent

UNITED STATES PATENTS

| | | |
|---|---|---|
| 1,561,146 | Fortescue | Nov. 10, 1925 |
| 2,141,939 | Shoults | Dec. 27, 1938 |
| 2,253,053 | Stevens et al. | Aug. 19, 1941 |
| 2,423,348 | Short | July 1, 1947 |
| 2,442,597 | Greenough | June 1, 1948 |

OTHER REFERENCES

Lauer, Lesnick, Matson: Servomechanism Fundamentals, McGraw-Hill, 1947, Fig. 2.10, page 31, and Fig. 2.8, page 29.

Principles and Practice of Electrical Engineering, 6th ed., McGraw-Hill, 1947, page 399, Figs. 347 and 348.